United States Patent [19]
Kahle et al.

[11] Patent Number: 5,758,141
[45] Date of Patent: May 26, 1998

[54] METHOD AND SYSTEM FOR SELECTIVE SUPPORT OF NON-ARCHITECTED INSTRUCTIONS WITHIN A SUPERSCALER PROCESSOR SYSTEM UTILIZING A SPECIAL ACCESS BIT WITHIN A MACHINE STATE REGISTER

[75] Inventors: James Allan Kahle, Austin; Albert J. Loper, Cedar Park; Soummya Mallick, Austin; Aubrey Deene Ogden, Round Rock, all of Tex.; John Victor Sell, Los Altos, Calif.

[73] Assignee: International Business Machines Corporation, Armonk, N.Y.

[21] Appl. No.: 386,977

[22] Filed: Feb. 10, 1995

[51] Int. Cl.⁶ .................................................. G06F 9/30
[52] U.S. Cl. ................................. 395/570; 395/568
[58] Field of Search ............................ 395/375, 800, 395/500, 568, 570, 591, 800.23, 800.41

[56] References Cited

U.S. PATENT DOCUMENTS

| | | | |
|---|---|---|---|
| 3,737,867 | 6/1973 | Cavin et al. | 395/567 |
| 4,754,393 | 6/1988 | Kitson et al. | 395/581 |
| 4,878,174 | 10/1989 | Watkins et al. | 395/595 |
| 4,928,223 | 5/1990 | Dao et al. | 395/597 |
| 4,992,934 | 2/1991 | Portanova et al. | 395/385 |
| 5,095,426 | 3/1992 | Senta et al. | 395/591 |
| 5,155,819 | 10/1992 | Watkins et al. | 395/800 |
| 5,179,691 | 1/1993 | O'Brien et al. | 395/500 |
| 5,201,043 | 4/1993 | Crawford et al. | 395/185.02 |
| 5,210,832 | 5/1993 | Maier et al. | 395/568 |
| 5,341,506 | 8/1994 | Nohmi et al. | 395/800 |
| 5,430,862 | 7/1995 | Smith et al. | 395/500 |
| 5,481,693 | 1/1996 | Blomgren et al. | 395/566 |

FOREIGN PATENT DOCUMENTS

| | | |
|---|---|---|
| 0 437 207 A2 | 1/1991 | European Pat. Off. |
| 0 478 904 A3 | 7/1991 | European Pat. Off. |
| 0 273 070 A1 | 12/1986 | Germany. |
| 2 290 395 | 12/1995 | United Kingdom. |

OTHER PUBLICATIONS

"High Performance Dual Architecture Processor", Disclosure Bulletin, IBM, vol. 36, No. 02, pp. 231–234, Feb. 1993.

*Primary Examiner*—Krisna Lim
*Assistant Examiner*—Viet Vu
*Attorney, Agent, or Firm*—Casimer K. Salys; Andrew J. Dillon

[57] ABSTRACT

A method and system for permitting the selective support of non-architected instructions within a superscalar processor system. A special access bit within the system machine state register is provided and set in response to each initiation of an application during which execution of non-architected instructions is desired. Thereafter, each time a non-architected instruction is decoded the status of the special access bit is determined. The non-architected instruction is executed in response to a set state of the special access bit. The illegal instruction program interrupt is issued in response to an attempted execution of a non-architected instruction if the special access bit is not set. In this manner, for example, complex instruction set computing (CISC) instructions may be selectively enabled for execution within a reduced instruction set computing (RISC) data processing system while maintaining full architectural compliance with the reduced instruction set computing (RISC) instructions.

8 Claims, 3 Drawing Sheets

METHOD AND SYSTEM FOR SELECTIVE SUPPORT OF NON-ARCHITECTED INSTRUCTIONS WITHIN A SUPERSCALER PROCESSOR SYSTEM UTILIZING A SPECIAL ACCESS BIT WITHIN A MACHINE STATE REGISTER

BACKGROUND OF THE INVENTION

1. Technical Field

The present invention relates in general to an improved data processing system and in particular to a method and system for selectively supporting non-architected instructions within a data processing system. Still more particularly the present invention relates to an improved method and system for selectively supporting execution of complex instructions set computing (CISC) instructions within a fully compliant reduced instruction set computing (RISC) processor system.

2. Description of the Related Art

Modern personal computer systems have reached an upper limit in speed of computation which will be difficult to surpass utilizing the so-called complex instruction set computing (CISC) based systems. Consequently, new designs have been proposed which utilize rapid and efficient processing of a relatively small set of instructions within a number of execution units in a single chip. Examples of this advanced microprocessor design include the PowerPC architecture jointly developed by International Business Machines Corporation and Motorola. By executing simple instructions which have been optimized so that execution can be carried out very rapidly, these reduced instruction set computing (RISC) systems can typically dispatch multiple instructions in a single clock cycle in a mode of operation known as "superscalar" operation.

While these reduced instructions set computing (RISC) systems can execute simple instructions very rapidly, certain operations which may be simply performed within a complex instruction set computing (CISC) system are quite time consuming to implement within a RISC system in that each complex instruction must necessarily be broken down into a large number of simple instructions. It is possible, depending upon the hardware configuration, for certain CISC instructions to be executed within a RISC processor; however, by permitting such CISC instructions to be executed within a RISC processor compliance with all aspects of the RISC architecture cannot be guaranteed. Consequently, this procedure is not greatly utilized.

In view of the above, it should be apparent that a system which is capable of executing both architected and non-architected instructions without endangering compliance with the primary architecture would be highly desirable.

SUMMARY OF THE INVENTION

It is therefore one object of the present invention to provide an improved data processing system.

It is another object of the present invention to provide an improved method and system for selectively supporting non-architected instructions within a data processing system.

It is yet another object of the present invention to provide an improved method and system for selectively supporting execution of CISC instructions within a fully compliant risk processor system.

The foregoing objects are achieved as is now described. The method and system of the present invention may be utilized to permit the selective support of non-architected instructions within a superscalar processor system. A special access bit within the system machine state register is provided and set in response to each initiation of an application during which execution of non-architected instructions is desired. Thereafter, each time a non-architected instruction is decoded the status of the special access bit is determined. The non-architected instruction is executed in response to a set state of the special access bit. The illegal instruction program interrupt is issued in response to an attempted execution of a non-architected instruction if the special access bit is not set. In this manner, for example, complex instruction set computing (CISC) instructions may be selectively enabled for execution within a reduced instruction set computing (RISC) data processing system while maintaining full architectural compliance with the reduced instruction set computing (RISC) instructions.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
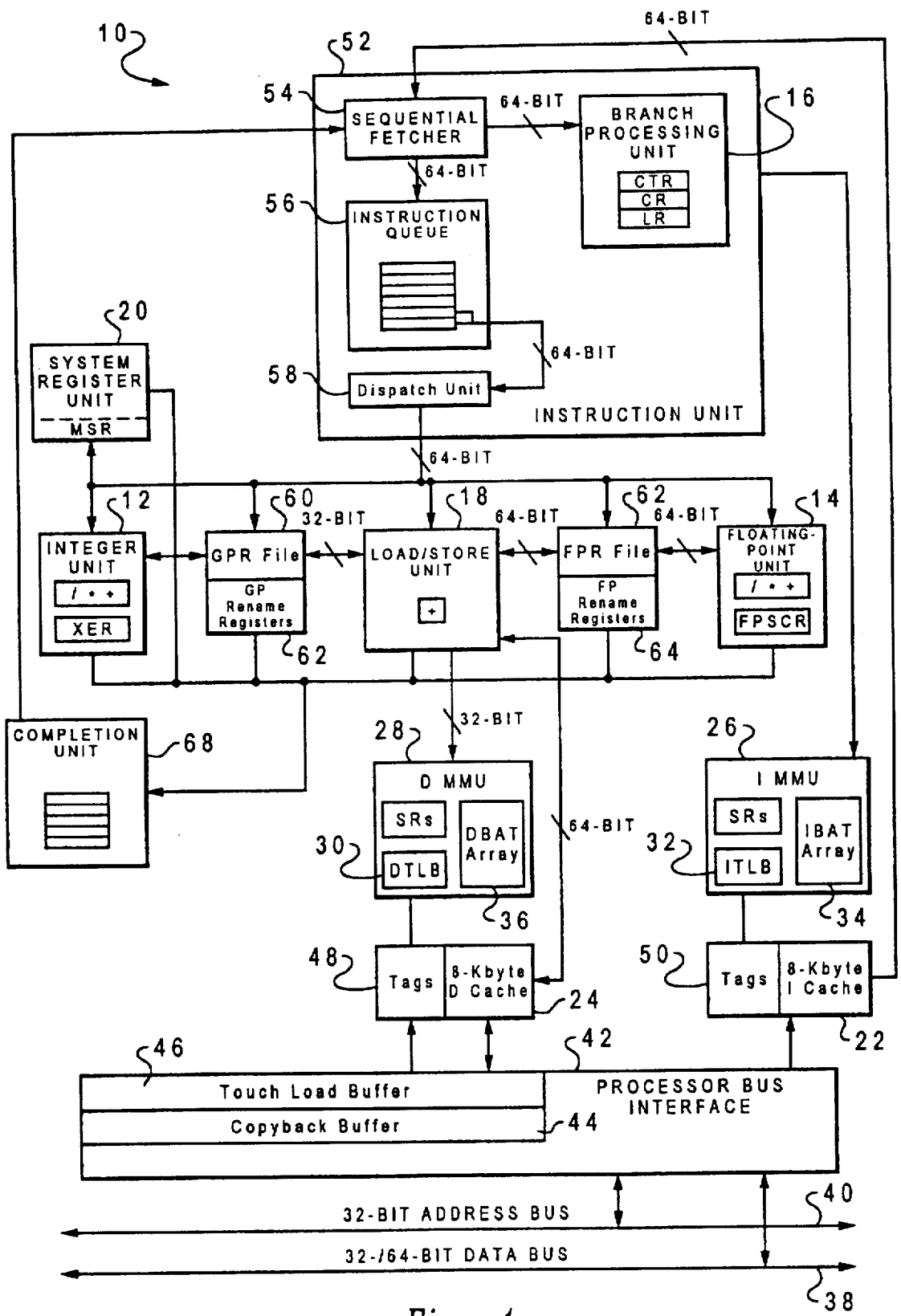
FIG. 1 is a high level block diagram of a data processing system which may be utilized to implement the method and system of the present invention.

FIG. 1 depicts a block diagram of a representative microprocessor 10 upon which the present invention is implemented. Microprocessor 10 may be selected from, for example, the family of PowerPC RISC Processors. This particular microprocessor 10 implements a 32-bit architecture, which provides 32-bit effective addresses and floating point data types of 32 bits. Significantly, the processor can issue and retire as many as two instructions per clock cycle, which instructions may be executed out-of-order for increased performance, but with completion appearing sequential for coherent and systematic operation.

Microprocessor 10 further includes five execution units, integer unit (IU) 12, floating point unit (FPU) 14, branch processing unit (BPU) 16, load-store unit (LSU) 18, and system register unit (SRU) 20 system register unit (SRU) 20 preferably includes a Machine State Register (MSR) which is utilized to store the state of the system for system management purposes. Microprocessor 10 further includes two physically addressed caches, one is an instruction cache 22 and the other is a data cache 24. Both caches are two-way set associative caches. Two memory management units (MMUs) are further included and consist of instruction MMU 26 and data MMU 28. Both MMUs contain 64-entry two-way set associative, data and instruction translation look aside buffers (DTLB and ITLB), 30 and 32, respectively, that provide support for demand-paged virtual memory addressed translation and variable-sized block translation. Microprocessor 10 also supports block address translation through the use of two independent instruction and data block translation (IBAT and DBAT) arrays 34 and 36 of four entries each. Effective addresses are compared simultaneously with all four entries in the BAT array 34 and 36 during block translation.

Microprocessor 10 also includes a selectable 32- or 64-bit data bus 38 and a 32-bit address bus 40. The interface protocol for microprocessor 10 allows multiple masters to compete for system resources through a central external arbiter. Both busses 38 and 40 are connected to processor bus interface 42, which includes a copy-back buffer 44 and a touch load buffer 46. Processor bus interface 42 is further connected to the instruction cache 22, data cache 24, and tags unit 48 and 50, which are connected to data cache 24 and instruction cache 22, respectively. Instruction cache 22 is further connected to instruction unit 52 while data cache 24 is connected to the load/store unit 18. Both instruction and data caches 22 and 24 are further connected to their respective memory management units 30 and 28 via their tags unit 48 and 50. Instruction fetching and issuing is handled in instruction unit 52. Translation of address for cache or external memory accesses is handled by the MMUs 28 and 30.

Instruction unit 52 also includes a sequential fetcher 54, instruction queue 56, dispatch unit 58 and batch processing unit 16, to provide centralized control of instruction flow to the execution units. Instruction unit 52 determines the address of the next instruction to be fetched based on information from the sequential fetcher 54 and from BPU 16.

Instruction unit 52 fetches instructions from instruction cache 22 into queue 56. BPU 16 extracts branch instructions from sequential fetcher 54 and uses static branch prediction on unresolved conditional branches to allow the instruction unit to fetch instructions from a predicted target instruction stream while a conditional branch is evaluated. Instruction queue 56 is designed to hold more than one instruction and can load more than one instruction from instruction unit 52 during a single cycle. Fetcher 54 continuously loads as many instructions as space in the instruction queue allows. Dispatch unit 58 performs source and destination register dependency checking, determines dispatch serializations, and inhibits subsequent instruction dispatching as required.

Branch processing unit 16 receives branch instructions from fetcher 54 performs CR lookahead operations on conditional branches to resolve those branches early, achieving the effect of a zero cycle branch in many cases.

Load/store unit 18 executes all load and store instructions and provides the data transfer interface between general purpose registers (GPRs) 60, floating point registers (FPRs) 62, and the cache/memory subsystem. Load/store unit 18 calculates effective addresses, performs data alignment and provides sequencing for load/store string and multiple instructions. Load and store instructions are issued and translated in program order; however, the actual memory accesses can occur out-of-order. Synchronizing instructions are provided to enforce strict ordering.

Cacheable loads, when free of data dependencies, execute in a speculative manner with a maximum throughput of once per cycle and a two-cycle total latency. Data removed from the cache is held in rename registers 64 and 66 until completion unit 68 commits the value to a GPR or FPR. Stores cannot be executed speculatively and are held in the store queue until completion unit 68 signals that the store operation is to be completed to memory. The time required to perform the actual load or store operation varies depending on whether the operation involves the cache, system memory, or an I/O device.

MMUs 34 and 36 support both virtual memory and physical memory for instruction and data. MMUs 34 and 36 also control access privileges for the spaces on block and page granularities. LSU 18 calculates effective addresses for data loads and stores, performs data alignment to and from cache memory, and provides the sequencing for load and store string and multiple word instructions. The instruction unit 52 calculates the effective addresses for instruction fetching.

After an address is generated, the higher-order bits of the effective address are translated by the appropriate MMU into physical address bits. Simultaneously, the lower-order address bits are directed to the caches where they form the index into the two-way set associative tag array. After translating the address, the MMU passes the higher-order bits of the physical address to the cache, and the cache lookup completes.

Cache units 22 and 24 each have a line size of 32 bits in length and provides a 64-bit interface to instruction fetcher 54 and load/store unit 18, respectively. The surrounding logic or tags 48 and 50, select, organize, and forward the pre-requested information to the requesting unit. Write operation to the cache can be performed on a byte basis, and a complete read-modify-write operation to the cache can occur in each cycle. Both load/store unit 18 and instruction fetcher 54 provide caches 24 and 22 with the address of the data or instruction to be fetched. In the case of a cache hit, the cache returns two words to the requesting unit.

The data cache tags 48 are single ported, and thus simultaneous load or store and snoop accesses can cause resource contention. Snoop accesses have the highest priority and are given first accesses to tags 48, unless the snoop access coincides with a tag write, in which case the snoop is retried and must be rearbitrated for access to the cache. Load or stores that are deferred due to snoop accesses are executed on the clock cycle following the snoop.

Figure 2:
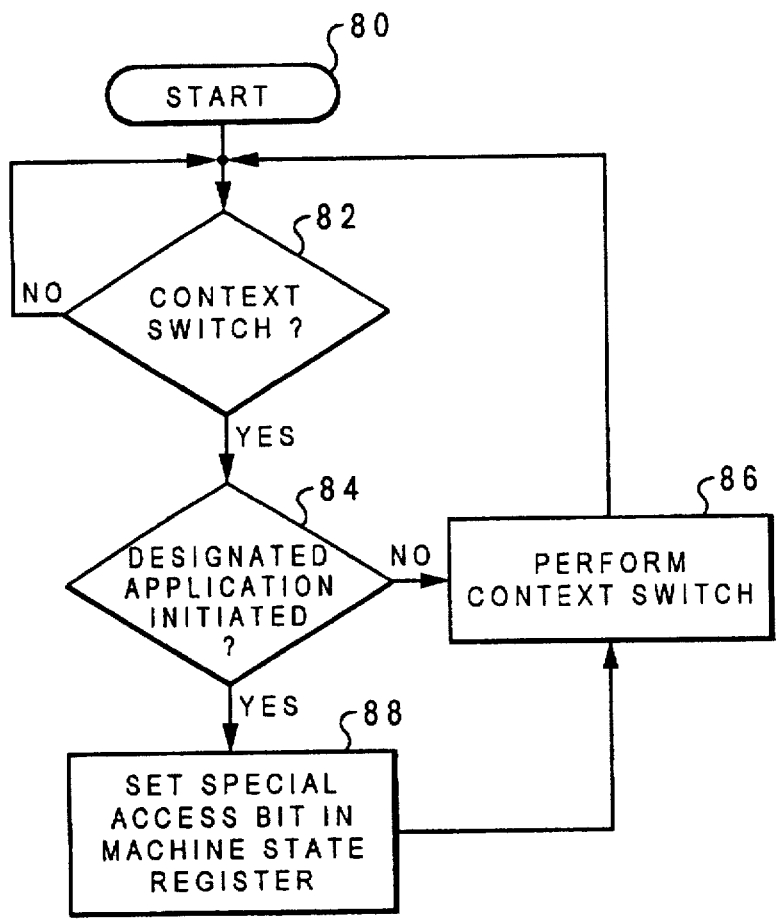
FIG. 2 is a high level logic flowchart which illustrates the selective enablement of the execution of non-architected instructions within the data processing system of FIG. 1 in accordance with the method and system of the present invention.

Referring now to FIG. 2 there is depicted a high level logic flowchart which illustrates the selective enablement of the execution of non-architected instructions within the data processing system of FIG. 1 in accordance with the method and system of the present invention. The process depicted within this high level logic flowchart, as well as the processes depicted within the following high level logic flowcharts may be implemented simply and efficiently within a processor system of the type depicted within FIG. 1.

As illustrated, this process begins at block 80 and thereafter passes to block 82. Block 82 illustrates a determination of whether or not a context switch has occurred. As those skilled in the art will appreciate, context switching is a type of multitasking wherein the central processor's "attention" is switched from one task to another, rather than allocating increments of time to each task in turn. In the event a context switch has not occurred, the process merely iterates until such time as a context switch occurs.

Still referring to block 82, in the event a context switch has occurred, the process passes to block 84. Block 84 illustrates a determination of whether or not a designated application has been initiated. That is, an application during which execution of non-architected instructions is desired. If not, the process passes to block 86 which illustrates the performance of the context switch and the process returns, in an iterative fashion to await the next occurrence of a context switch.

Referring again to block 84, in the event a designated application has been initiated, that is an application during which execution of non-architected instructions is desired, the process passes to block 88. Block 88 illustrates the setting of the special access bit within the machine state register for the system. As described above, the machine state register is a register which contains a plurality of bits which specify the state of the system at any given time such that context switching may be simply and easily accomplished. In the depicted embodiment of FIG. 1, the machine state register is contained within system register unit 20. Thereafter, the process passes to block 86 which illustrates the performance of a context switch and the process then returns to block 82, in an iterative fashion.

Figure 3:
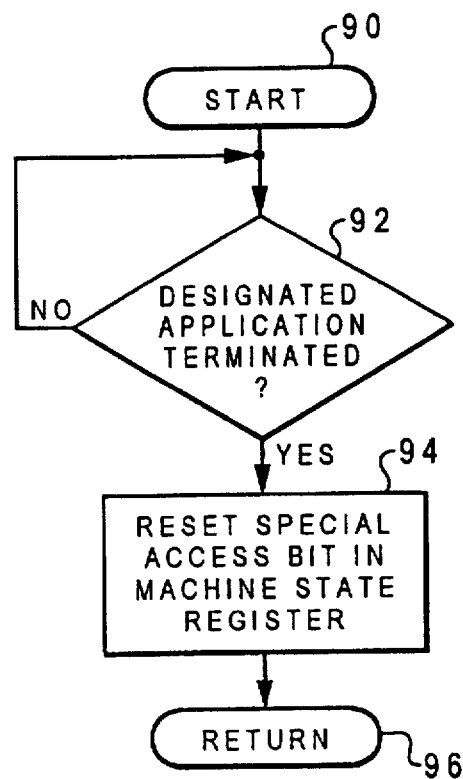
FIG. 3 is a high level logic flowchart which illustrates the selective disablement of the execution of non-architected instructions within the data processing system of FIG. 1 in accordance with the method and system of the present invention.

With reference now to FIG. 3, there is depicted a high level logic flowchart which illustrates the selective disablement of the execution of non-architected instructions within the data processing system of FIG. 1. As above, this process begins at block 90 and thereafter passes to block 92. Block 92 illustrates a determination of whether or not a designated application has terminated. That is, an application during which execution of non-architected instructions was desired. If the termination of an application other than a designated application has occurred, or in response to the non-termination of the designated application the process merely iterates.

Still referring to block 92, in the event termination of a designated application has occurred, the process passes to block 94. Block 94 illustrates the resetting of the special access bit within the machine state register. As noted above, the special access bit is a special bit which has been established within the machine state register to indicate that execution of "special" instructions is permitted while this bit is set. Thereafter, the process passes to block 96 and returns. Thus, upon reference to FIGS. 2 and 3 those skilled in the art will appreciate that by providing a "special access" bit within the machine state register of a data processing system and by setting that bit in response to the initiation of a designated applciation the execution of non-architected instructions may be permitted during execution of that application without endangering compliance with the primary architecture during the execution of other applications.

Figure 4:
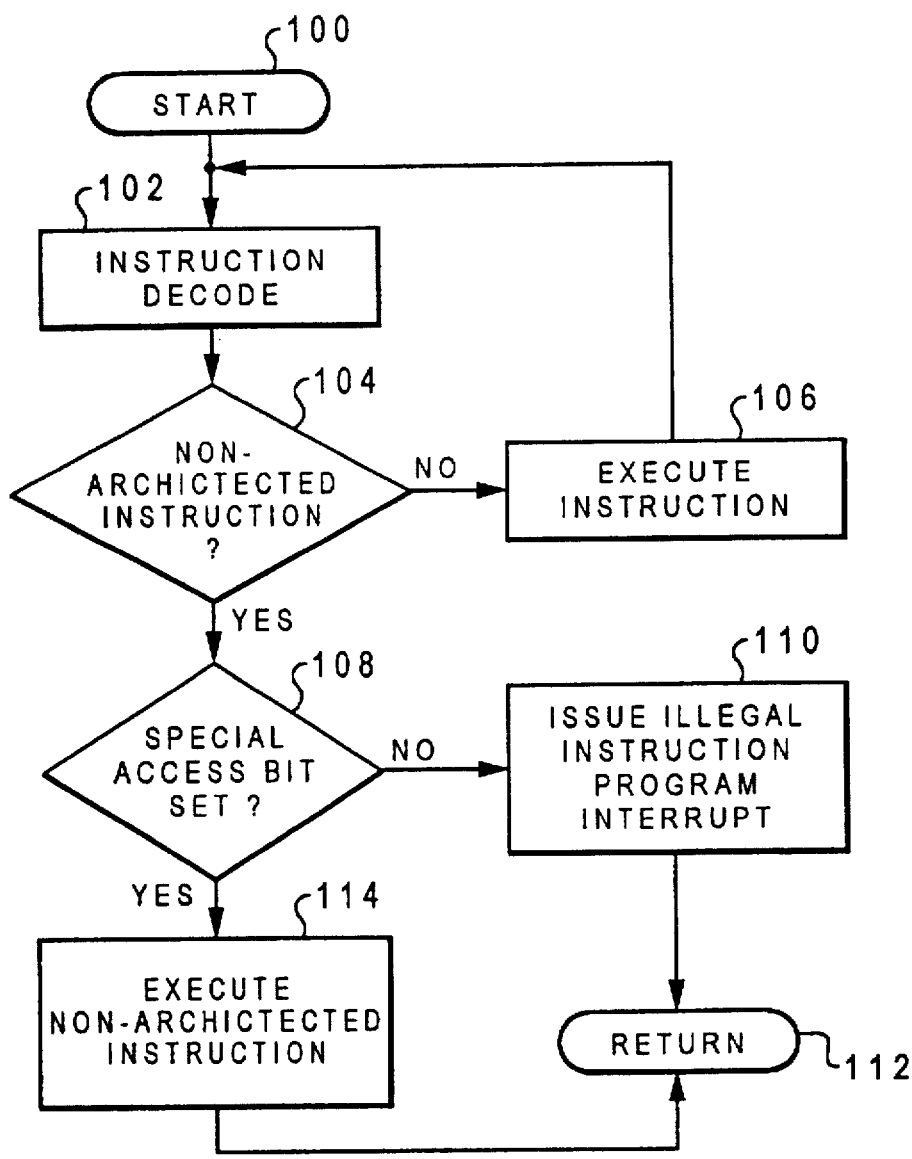
FIG. 4 is a high level logic flowchart which illustrates the execution of non-architected instructions within the data processing system of FIG. 1 in accordance with the method and system of the present invention.

Finally, with reference to FIG. 4, there is depicted a high level logic flowchart which illustrates the execution of non-architected instructions within the data processing system of FIG. 1, in accordance with the method and system of the present invention. As depicted, this process begins at block 100 and thereafter passes to block 102. Block 102 illustrates the decoding of an instruction. Thereafter, the process passes to block 104.

Block 104 illustrates a determination of whether or not the instruction just decoded is a non-architected instruction. If not, the process passes to block 106 which illustrates the execution of that instruction and the process then returns to block 102, in an iterative fashion, to await the decoding of the next instruction.

Referring again to block 104, in the event the instruction which has just been decoded is a non-architected instruction, the process passes to block 108. Block 108 illustrates a determination of whether or not the special access bit has been set. Those skilled in the art will appreciate that this determination is simply a matter of accessing the machine state register to determine the status of that bit. If the special access bit is not set the process passes to block 110. Block 110 illustrates the issuance of an illegal instruction program interrupt and the process then passes to block 112 and returns.

Referring again to block 108, in the event the special access bit is set the process passes to block 114. Block 114 illustrates the execution of a non-architected instruction and the process once again passes to block 112 and returns.

Upon reference to the foregoing those skilled the art will appreciate that by implementing the special access bit described within the present application and setting and resetting that bit in accordance with the initiation of an application during which execution of non-architected instructions is desired, the method and system of the present invention permits the execution of CISC-type instructions within a RISC architecture system without violating the RISC architecture and allow maintaining full compliance with RISC architecture requirements. In this manner instructions such as on-chip ROM look ups for algorithm arithmetic operations, support for data DSP applications and various other CISC instructions may be provided within a RISC architecture system, while maintaining compliance with the RISC architecture.

While the invention has been particularly shown and described with reference to a preferred embodiment, it will be understood by those skilled in the art that various changes in form and detail may be made therein without departing from the spirit and scope of the invention.

We claim:

1. A method for supporting the execution of non-architected instructions within a selected application within a superscalar processor system designed to execute an instruction stream of specific architecture instructions, said method comprising the steps of:

identifying a selected application during which execution of non-architected instructions is desired;

setting a special access bit within a machine state register of said superscalar processor system in response to an initiation of said selected application;

determining the status of said special access bit in response to each attempted execution of a non-architected instruction;

executing said non-architected instruction in response to a set status of said special access bit; and initiating an illegal instruction program interrupt in response to a non-set status of said special access bit.

2. The method for supporting the execution of non-architected instructions within a selected application within a superscalar processor system according to claim 1, wherein said instruction stream includes various user level instructions and supervisory level instructions, each of said supervisory level instructions permitting execution of a privileged operation within said system and wherein said step of setting a special access bit within a machine state register of said superscalar processor system in response to an initiation of said selected application comprises the step of setting a special access bit within a machine state register of said superscalar processor system utilizing a supervisory level instruction.

3. The method for supporting the execution of non-architected instructions within a selected application within a superscalar processor system according to claim 1, further including the step of resetting said special access bit within said machine state register of said superscalar processor system in response to a termination of said selected application.

4. The method for supporting the execution of non-architected instructions within a selected application within a superscalar processor system according to claim 1, wherein said superscalar processor system is designed to execute an instruction stream of reduced instruction set computing (RISC) instructions and wherein said step of determining the status of said special access bit in response to each attempted execution of a non-architected instruction comprises the step of determining the status of said special access bit in response to an attempted execution of a complex instruction set computing (CISC) instruction.

5. A system for supporting the execution of non-architected instructions within a selected application within a superscalar processor system designed to execute an instruction stream of specific architecture instructions, said system comprising:

a machine state register within said superscalar processor system for storing a plurality of bits indicative of the state of said superscalar processor system;

means for setting a special access bit within said machine state register in response to an initiation of a selected application during which execution of non-architected instructions is desired;

means for determining the status of said special access bit in response to each attempted execution of a non-architected instruction;

means for executing said non-architected instruction in response to a set status of said special access bit; and means for initiating an illegal instruction program interrupt in response to a non-set status of said special access bit.

6. The system for supporting the execution of non-architected instructions within a selected application within a superscalar processor system according to claim 5, wherein said instruction stream includes various user level instructions and supervisory level instructions, each of said supervisory level instructions permitting execution of a privileged operation within said system and wherein said means for setting a special access bit within a machine state register of said superscalar processor system in response to an initiation of said selected application comprises means for setting a special access bit within a machine state register of said superscalar processor system utilizing a supervisory level instruction.

7. The system for supporting the execution of non-architected instructions within a selected application within a superscalar processor system according to claim 5, further including means for resetting said special access bit within said machine state register of said superscalar processor system in response to a termination of said selected application.

8. The system for supporting the execution of non-architected instructions within a selected application within a superscalar processor system according to claim 5, wherein said superscalar processor system is designed to execute an instruction stream of reduced instruction set computing (RISC) instructions and wherein said means for determining the status of said special access bit in response to each attempted execution of a non-architected instruction comprises the step of determining the status of said special access bit in response to an attempted execution of a complex instruction set computing (CISC) instruction.

\* \* \* \* \*